United States Patent [19]
Stough et al.

[11] Patent Number: 5,711,124
[45] Date of Patent: Jan. 27, 1998

[54] DRYWALL TAPE WITH REMOVABLE ABSORBENT LAYER COVERING

[75] Inventors: Ronald A. Stough, Hinsdale, Mont.; Edward A. Thompson, De Pere; Karl A. Schmidt, Green Bay, both of Wis.

[73] Assignee: E-Z Taping System, Inc., Green Bay, Wis.

[21] Appl. No.: 677,382

[22] Filed: Jul. 5, 1996

Related U.S. Application Data

[63] Continuation-in-part of Ser. No. 513,386, Aug. 10, 1995, which is a continuation-in-part of Ser. No. 297,320, Aug. 26, 1994, Pat. No. 5,486,394.

[51] Int. Cl.$^6$ ........................................................ E04B 2/00
[52] U.S. Cl. ...................... 52/417; 428/343; 428/352; 428/354; 428/906
[58] Field of Search .................. 52/417, 420; 428/343, 428/352, 354, 906

[56] References Cited

U.S. PATENT DOCUMENTS

| | | |
|---|---|---|
| 1,357,350 | 11/1920 | Schumacher . |
| 2,463,244 | 3/1949 | Carter . |
| 2,502,499 | 4/1950 | Ames . |
| 3,300,330 | 1/1967 | Vassel et al. ............... 428/352 |
| 3,575,771 | 4/1971 | Padgett . |
| 3,625,798 | 12/1971 | Ihli . |
| 3,788,941 | 1/1974 | Kupits ......................... 428/352 |
| 4,041,201 | 8/1977 | Würker . |
| 4,042,739 | 8/1977 | Emal et al. . |
| 4,313,991 | 2/1982 | Lamb . |
| 4,331,727 | 5/1982 | Maas ............................ 428/906 |
| 4,398,985 | 8/1983 | Eagon ....................... 428/352 X |
| 4,406,730 | 9/1983 | Altmix . |
| 4,522,004 | 6/1985 | Evans et al. ................ 52/417 X |
| 4,652,331 | 3/1987 | Plasencia . |
| 4,707,202 | 11/1987 | Sweeny . |
| 4,750,968 | 6/1988 | Sweeny . |
| 4,757,783 | 7/1988 | Matheny . |
| 4,792,473 | 12/1988 | Vitale . |
| 4,835,925 | 6/1989 | Hoffman, Sr. . |
| 4,863,774 | 9/1989 | Tucker . |
| 4,913,766 | 4/1990 | Löjdström . |
| 4,977,718 | 12/1990 | Hoffmann, Sr. . |
| 5,037,686 | 8/1991 | Conboy . |
| 5,198,300 | 3/1993 | Matthews et al. . |
| 5,242,725 | 9/1993 | Weissman et al. .......... 428/906 X |
| 5,246,775 | 9/1993 | Loscuito . |
| 5,486,394 | 1/1996 | Stough . |

FOREIGN PATENT DOCUMENTS

| | | | |
|---|---|---|---|
| 2305919 | 10/1976 | France | 428/906 |
| 48-27462 | 8/1973 | Japan | 428/906 |
| 869952 | 5/1971 | United Kingdom | 428/343 |

Primary Examiner—Wynn E. Wood
Assistant Examiner—Laura A. Callo
Attorney, Agent, or Firm—Lathrop & Clark

[57] ABSTRACT

A self-adhesive wall board joint tape has a paper base layer with a mud or plaster receptive surface, the other surface has a pressure sensitive adhesive. A transfer liner is applied with a release surface against the adhesive surface of the paper base layer, and is coated on the opposite side with a low-tack releasable adhesive. When wound into rolls the transfer liner low-tack adhesive engages the untreated surface of an underlying base layer. The pull strength of the low-tack adhesive is selected to be greater than the pull strength of the high-tack adhesive on the release surface of the transfer liner. When unwound from the roll the transfer liner is adhered to the non-adhesive paper base layer, and the adhesive high-tack surface of the paper base layer is presented for immediate adhesion, without the need to remove a backing.

11 Claims, 5 Drawing Sheets

5,711,124

DRYWALL TAPE WITH REMOVABLE ABSORBENT LAYER COVERING

RELATED APPLICATIONS

This application is a continuation-in-part of application Ser. No. 08/513,386, filed Aug. 10, 1995, which is a continuation-in-part of application Ser. No. 08/297,320, filed Aug. 26, 1994, and now U.S. Pat. No. 5,486,394.

FIELD OF THE INVENTION

The present invention relates to drywall and plasterboard installation materials in general, and to tape for overlying wallboard seams in particular.

BACKGROUND OF THE INVENTION

In modem commercial and residential construction interior wall surfaces are typically formed from flat modular units affixed to wood or metal studs. These units, know as sheet rock, gypsum board, plasterboard or generically herein as wallboard, come in standard dimensions which are abutted to form a continuous surface. In order to present a surface which is unmarked by seams, it is necessary to position bridging tape which overlaps the seam and which supports a coating of a wet plaster-like compound known as mud. The mud is applied to obscure any variations in the wall profile, and to form the wall surface into an uninterrupted expanse.

Conventional drywall tape is typically a simple kraft paper strip which is adhered to the drywall surfaces by a coating of mud. Because the mud must be applied as the tape is positioned, operators must take care not to discharge the mud onto non-work surfaces. In addition, once the drywall tape has been applied an installer must wait as much as a day for the mud to dry before a final surface coat of mud can be applied.

Self-adhesive drywall tapes have been previously suggested. An open fiberglass mesh self-adhesive drywall joint tape has been used. However, to fill the large openings in this mesh, a joint compound must be applied to the mesh before the final mud coat. Other tapes have had molded plastic shapes, or have required a removable release backing strip which must be peeled away from the tape as it is applied, providing a complicating additional step to the taping operation.

What is needed is a tape for drywall installation which may be applied in a single step, without the need for removal of a release backing, and which permits immediate application of drywall mud.

SUMMARY OF THE INVENTION

The wall board joint tape of this invention has an untreated paper base layer which is particularly suited to receiving mud or plaster. One surface of the tape is covered with a pressure sensitive adhesive for convenient application to a joint between wall board panels. A transfer liner is applied with a release surface against the adhesive surface of the paper base layer, and is coated on the opposite side with a low-tack releasable adhesive. When wound into rolls the transfer liner low-tack adhesive engages the untreated surface of an underlying base layer. The pull strength of the low-tack adhesive is selected to be greater than the pull strength of the high-tack adhesive on the release surface of the transfer liner. Hence when the tape is unwound from the roll the transfer liner is adhered to the non-adhesive untreated surface of the paper base layer, and the adhesive high-tack surface of the paper base layer is presented for immediate adhesion across the joint, without the need to remove a backing. The untreated surface of the paper remains covered by the transfer liner and protected from contamination until such time as the mud or plaster layer is to be applied. Perforations may be provided in the tape. The tape of this invention may also be applied in fire wall applications.

It is an object of the present invention to provide a self-adhesive wall board tape which adheres to a wall board surface and which may be supplied in wound rolls, yet which presents an absorbent paper surface to overlying applied material.

It is another object of the present invention to provide a tape for application to drywall which is self-adhesive and which does not require application of mud to adhere to the drywall.

It is a further object of the present invention to provide a paper tape assembly for application to drywall which may be wound in rolls for releasable engagement with itself.

It is an additional object of the present invention to provide a tape for application in fire walls.

It is yet another object of the present invention to provide a tape for application to drywall having a pressure-sensitive adhesive which retains its adhesion when the tape is covered with drywall mud, and having an outwardly facing surface which retains mud thereon.

Further objects, features and advantages of the invention will be apparent from the following detailed description when taken in conjunction with the accompanying drawings.

DESCRIPTION OF THE PREFERRED EMBODIMENTS

Figure 1:
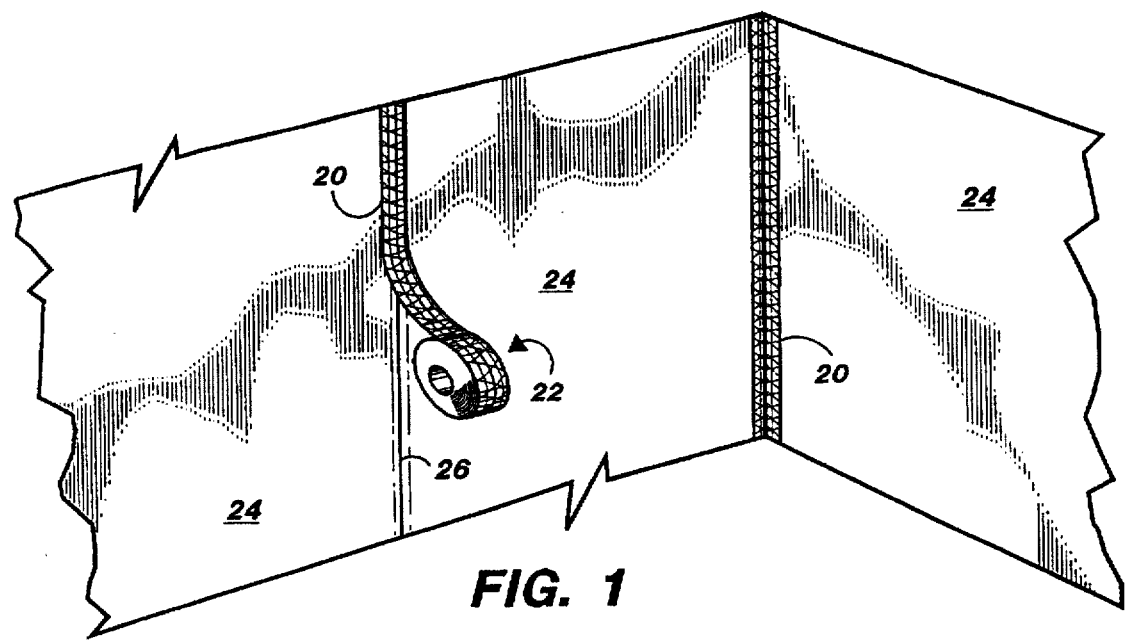
FIG. 1 is a pictorial view representing the tape of this invention being applied to a seam between adjacent sheets of drywall material.

Referring more particularly to FIGS. 1–12, wherein like numbers refer to similar parts, the drywall tape 20 of this invention is preferably coiled into rolls 22, as shown in FIG. 1. An interior surface suitable for painting or attachment of other wall covering is formed in a dwelling or other structure by first attaching drywall panels 24 to wall studs (not shown). Drywall panels 24 are typically provided in a limited assortment of fixed dimensions, for example four by eight feet. In order to form a wall surface of greater dimensions, a number of drywall panels 24 are affixed to the wall studs in adjacent relationship. The vertically or horizontally mounted drywall panels, which are usually formed of a stiff interior chalk-like material surrounded by a paper coating, present linear grooves or gaps at the seams 26 where the panels 24 abut. The seams 26, if left untreated, would present a visually unattractive pattern possibly visible through the final wall finish. To obscure the seams and to present the appearance of a continuous uninterrupted wall surface each seam 26 is bridged by a segment of the tape 20, which provides a means for bridging the seam between a first sheet of drywall and a second sheet of drywall.

A common prior art drywall tape was a simple sheet of kraft paper which was adhered to the drywall seam by an application of a gypsum compound or mud. This application of mud was typically messy, and required a period of time up to a day between application of the tape and application of the overall mud coat.

The tape 20 has a pressure-sensitive adhesive coating 28 which allows the tape 20 to be adhered to the drywall panels 24 without mud or activating liquid. The coating 28 provides a means for adhering the tape to two sheets of drywall in response to the application of pressure. The adhesive 28 is preferably an aqueous-base acrylic adhesive. The quantity of adhesive employed will determine the level of initial tack. An exemplary range of adhesive quantities is five to twelve pounds of adhesive per 3,000 square feet of product, with eight pounds representing a level which balances added adhesive cost with greater initial tack. Once the adhesive is formulated and applied to paper it should not be affected by being rewetted.

Figure 2:
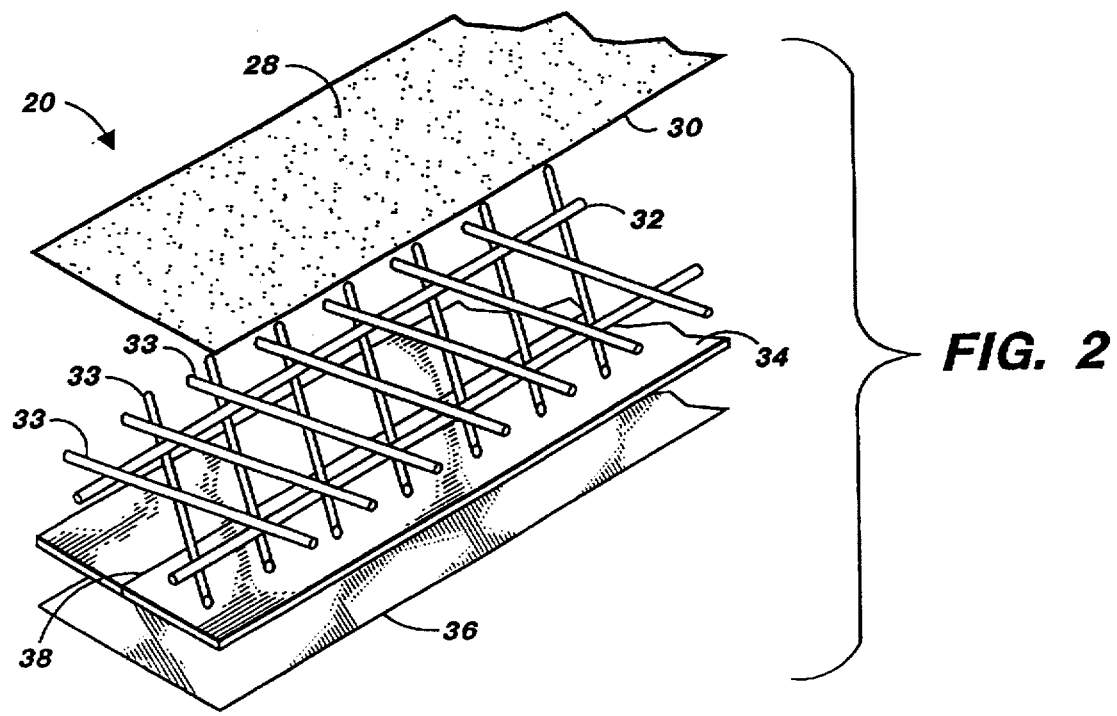
FIG. 2 is an exploded isometric view of the unified layers of the drywall tape of FIG. 1.

As shown in FIG. 2, the adhesive coating 28 is formed on a base layer 30 which is preferably 25–30 pound flat back paper. The base layer 30 is flexible, allowing the tape 20 to be coiled and uncoiled from the roll 22. The base layer is preferably a kraft paper. For reduced cost the base layer need not be a white paper, as its color will not detrimentally show through the top layer 34.

A means for reinforcing the tape to resist tearing is provided by a web 32 of fiberglass multi-filamented strands 33 overlies the paper base layer 30. The strands may be arrayed in a diamond pattern as shown, or may be placed in a rectangular pattern or any other reinforcing array. The fiberglass strands may be those produced by Owens Corning or Pittsburgh Plate Glass Company.

In contrast to some strapping tapes which have strands on a film base running in an exclusively machine direction, the tape 20 has strands which also run in the cross-machine direction, giving the tape tear resistance. The cross direction strands may be 150 1/0 fiberglass strands. Typically, the strands running in the machine direction need not be so strong as the strands running in the cross-machine direction, because there are more strands running in the machine direction.

A top layer 34 is a flexible white paper which overlies the fiberglass web 32 and is permanently adhered to the base paper layer 30 by a hot melt amorphous polypropylene adhesive. The top layer is preferably 25–40 pound paper. The top layer may have a smooth surface, or alternatively it may have a roughened surface.

The tape 20 is manufactured in an automatic process in which the fiber glass strands extend in two patterns, an angled pattern in the cross direction and lengthwise in the machine direction. The sheet with the amorphous polypropylene comes from the bottom around a roll and engages the fiberglass and the top sheet between two rollers. The paper will generally be treated in widths of about 60–72 inches, and later cut down to tape roll size of approximately two inches width. The adhesive for attachment to the wall has not been applied to the base layer at the time of bonding the base layer to the top layer.

In order to prevent the adhesive coating 28 from forming a permanent bond with the top layer 34 when the tape 20 is wound into a roll 22, a means for releasing adhesively attached adjoining layers of tape in the form of a release coating 36 is applied to the top layer 34. The release coating 36 is preferably formed of low density polyethylene, similar to the coating on freezer paper, and is extruded or coated onto the top layer 34. Although the release coating is shown schematically in FIG. 2 as a separate unit, it should be noted that the release coating does not exist as a sheet other than as applied to the top layer 34.

Once the base layer 30 has been laminated to the top layer 34 with the strands 32 therebetween, the adhesive coating 28 is applied and the tape is cut to size and reeled on rolls.

The adhesive coating 28, the base layer 30, the web of strands 32, the top layer 34, and the release coating 36 are bonded to one another in a non-removable fashion to form a multilayer tape 20 which has the necessary attributes to serve for drywall purposes.

The release coating 36 also provides an acceptable adhesion surface for attachment of the drywall mud coating which overlies the tape and the drywall surfaces.

Figure 3:
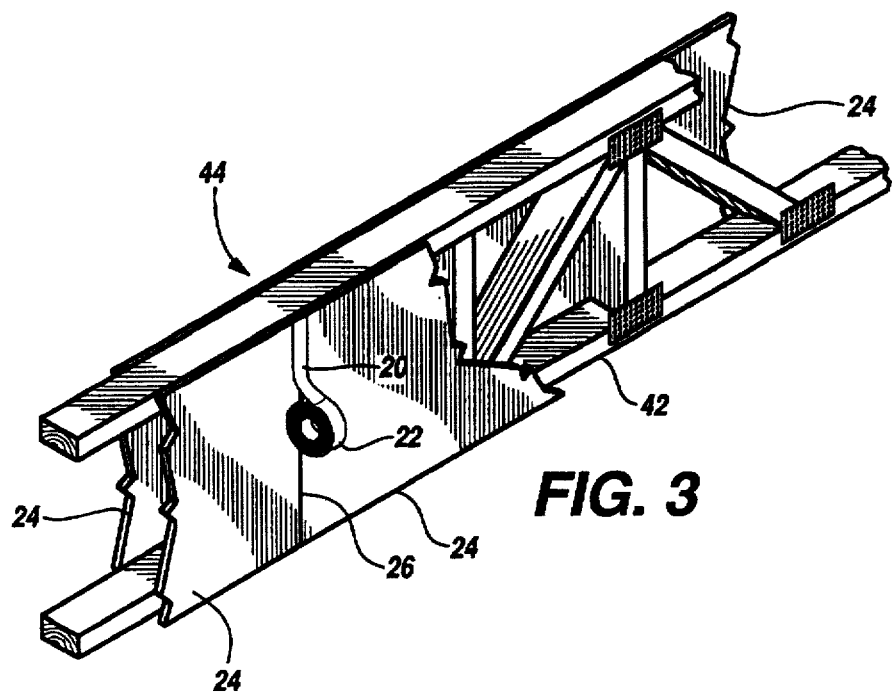
FIG. 3 is an isometric view of the tape of this invention being applied to a seam between adjacent sheets of drywall on a truss in a fire wall application.

In certain construction applications, drywall panels 24 are attached by fasteners to both faces of a supportive substructure such as a structural truss 42. Drywall in these applications helps to form a fire wall 44. Fire walls 44 are usually located in attics or in non-dwelling spaces of the building where the appearance of the drywall surface is not of concern. Prior art mudded paper tapes have commonly been used in fire wall applications. The typically tight quarters for attaching the drywall to form fire walls makes the use of mud for adhesive purposes even more cumbersome and unpleasant than usual. As shown in FIG. 3, the self-adhesive tape 20 of this invention may also be employed for construction of a fire wall. To construct a fire wall 44, drywall panels 24 are affixed to the truss 42 in a conventional manner, for example by nails. Drywall panels 24 are positioned on both faces of the truss 42 with the seams 26 between panels on one face of the truss staggered from the seams on the other face. The self-adhesive tape 24 is positioned over each seam 26 and pressed down to attach to the drywall panels 24 on either side of the seam. Because a smooth appearance is not called for in a fire wall, as it will generally not be viewed by the inhabitants, no finishing coat of mud is needed. In short, the entire fire wall construction process can take place with no mud whatsoever. However in some applications, code requirements may require a coat of mud over the tape. Where increased fire burn time is required of the fire wall, a second layer of drywall panels is applied, with the seams staggered from those of the first layer. The tape 20 may also be used for taping the seams of the second layer of drywall.

Figure 4:
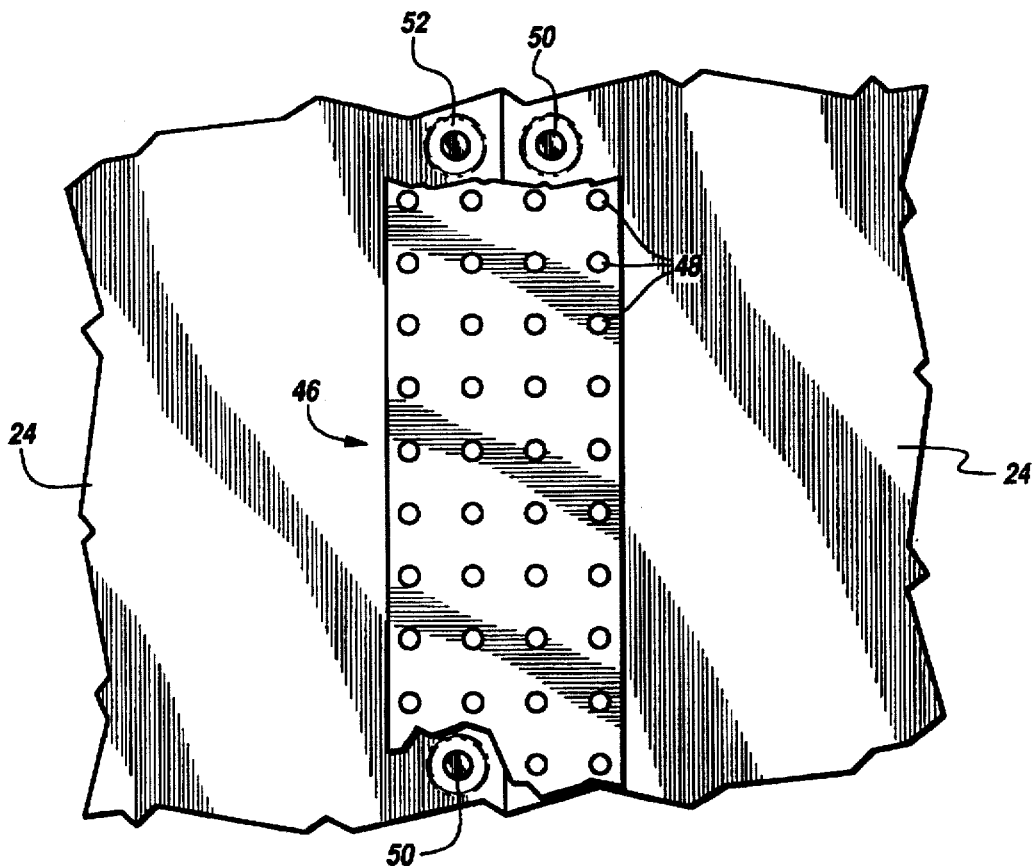
FIG. 4 is a fragmentary view of an alternative embodiment of the tape of this invention having a plurality of perforations and being applied to a seam between adjacent sheets of drywall material.

An alternative embodiment drywall tape 46 of this invention is shown in FIG. 4. The tape 46 is the self-adhesive tape 20 with an array of perforations 48 formed therein. The perforations 48 perform two functions. First, the perforations 48 allow air caught beneath the tape 46 in application to escape, thereby avoiding bubbles beneath the tape, or regions in which the tape 46 does not adhere to the drywall panel 24. Because drywall is commonly attached to stud walls by nails 50, slight dimples or depressions 52 are formed surrounding the nails. The perforations 48 not only make the tape more flexible to better extend into the depressions 52, but they allow the finish coat of mud to penetrate through the tape and fill most depressions. The perforations also allow the moisture contained in the mud to penetrate the tape and be absorbed in the drywall panels.

In a preferred embodiment, the perforations are approximately one-eighth of an inch in diameter, and are located on one-half inch centers, four across on a 58 mm wide tape.

The perforations may be formed in several ways. A roller may be provided with an array of protruding tack-like spikes which puncture the tape and form openings in the tape, with the punctured paper still retained to the tape in the form of a tiny flap. Alternatively, as in the tape shown in FIG. 4, the perforations may be formed by a repeat punch unit which die cuts the perforations, with a blower to remove the punched-out holes or chad.

Although the tape 20, 46 has been discussed in the context of wall-covering drywall panels, its application is equally suitable for ceiling-forming drywall panels.

Figure 5:
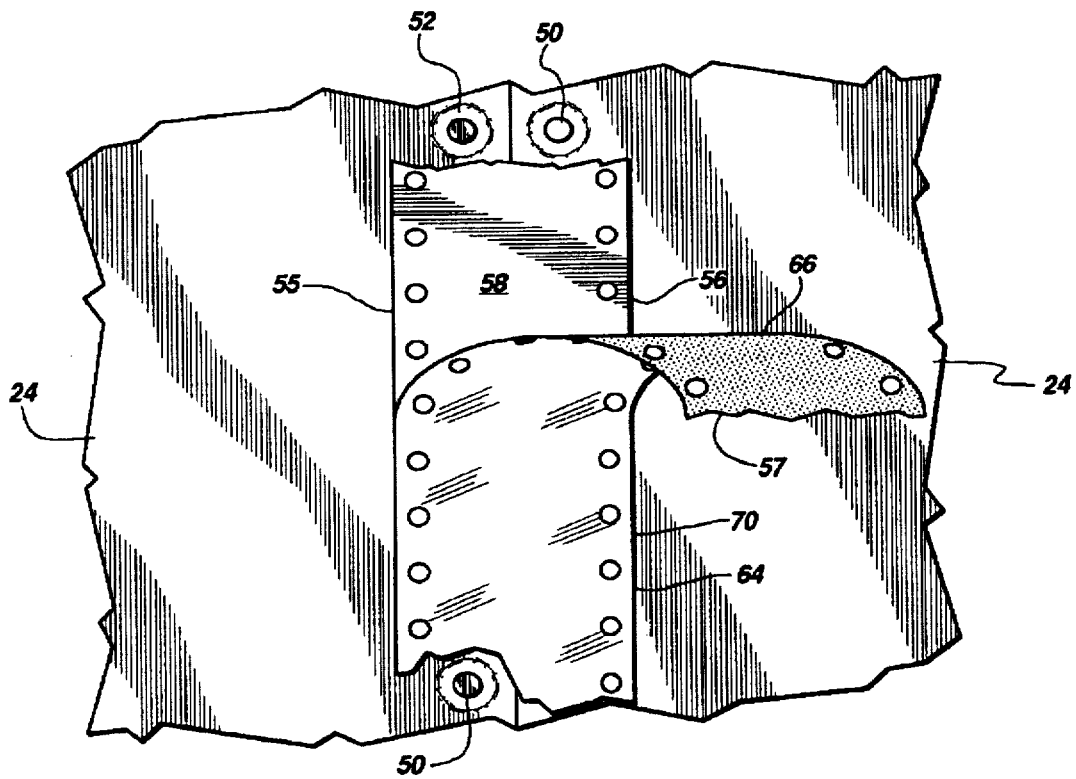
FIG. 5 is a fragmentary isometric view of an alterative embodiment tape of this invention having a paper surface with a peel-away liner.

An alternative embodiment tape assembly 54 of this invention which has an untreated paper outer surface is shown in FIG. 5. The tape assembly 54 is comprised of a self-adhesive tape 55 and a removable transfer liner 57. The tape 55 has a paper base layer 56, shown in FIG. 6, which in a preferred embodiment is identical to the conventional paper non-adhesive drywall tape such as is available from International Paper Company of New York. This paper base layer 56 may be an 85 lb basis weight paper and is selected to have an outer surface 58 which is untreated and absorptive and hence receptive to the mud coating which will be applied over the tape. The paper may have either a sanded or unsanded finish. Other common paper drywall tape basis weights may be used, for example 90 pounds or 94 pounds. In a similar way, the tape 55 is receptive to a plaster coating, when the tape is used in plaster veneer applications with gypsum boards having a porus paper coating, known as "blue board."

The inner surface 60 of the base layer is coated with a layer of high tack adhesive 62, for example an aqueous acrylic adhesive such as 15–20 pounds per 3000 square feet Green Bay Packaging #540 adhesive, available from Green Bay Packaging, of Green Bay, Wis. For improved adhesion and reduced migration of the adhesive into the base layer, a clay coating may be applied to the base layer 56 prior to application of the high-tack adhesive. Because the absorptive untreated surface 58 of the base layer would adhere in a somewhat permanent fashion to the high-tack adhesive layer 62 of an overlying length of tape 55 if placed in direct engagement, a means for keeping the two surfaces separate is required. The transfer liner 57 is a lighter weight paper, for example a 20–60 pound layflat liner, which is provided on one face with a release surface 64 which may be formed by an application of silicone. The release surface will engage with the high-tack adhesive of the base layer 56, but is easily releasable from the high-tack adhesive, requiring a peel strength of, for example, 10–15 grams per inch. The other face of the transfer liner 57 is coated with a low tack removable adhesive layer 66. The removable adhesive is similar to the type employed with removable sticky note pads. An exemplary adhesive is Morstik® 240 adhesive available from Morton International, Inc. of Chicago Ill. Another suitable adhesive is AROSET® APS-1250 water-based pressure sensitive adhesive, available from Ashland Chemical Co. Division of Ashland Inc. of Columbus Ohio. Other removable adhesives may also be used. However, the low-tack adhesive should be such that when adhered to the outer surface 58 of the base layer 56 and removed, the receptivity of the base layer 56 to mud or plaster will not be substantially impaired. The removable adhesive layer is designed to adhere to the outer surface of the paper base layer when the tape assembly 54 is wound into a roll 68.

Figure 11:
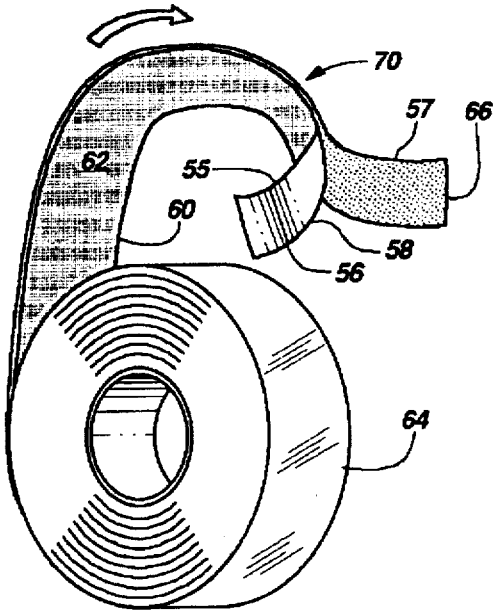
FIG. 11 is an isometric view of the tape assembly of FIG. 9 being removed from the roll of FIG. 10.
Figure 6:
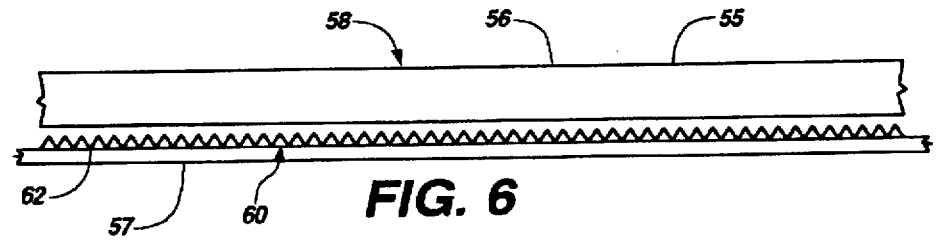
FIG. 6 is a schematic view of a precursor to the tape of FIG. 5 showing the paper base layer and the transfer liner with a high tack adhesive applied thereto.
Figure 7:
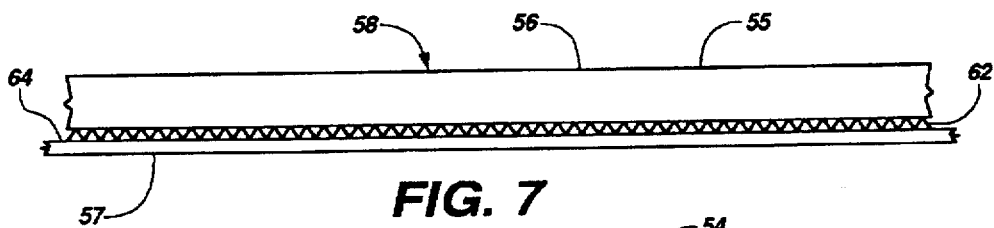
FIG. 7 is a schematic view of the precursor tape of FIG. 6 with a transfer liner having a silicon release surface affixed to the adhesive side of the paper base layer.
Figure 8:
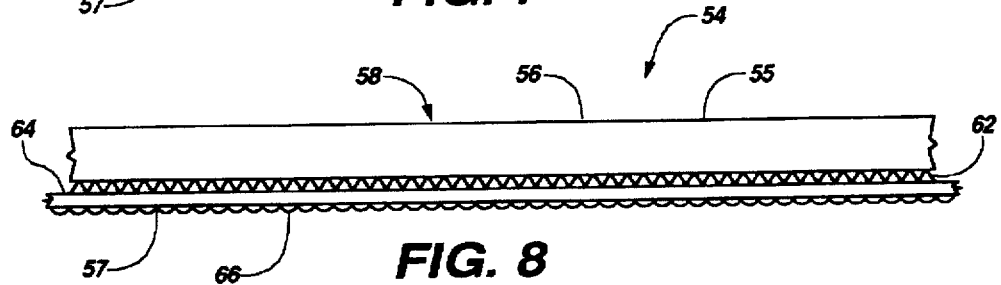
FIG. 8 is a schematic view of the assembly of FIG. 7 having a low-tack releasable adhesive applied to a surface of the transfer liner prior to winding of the assembly into a roll.
Figure 9:
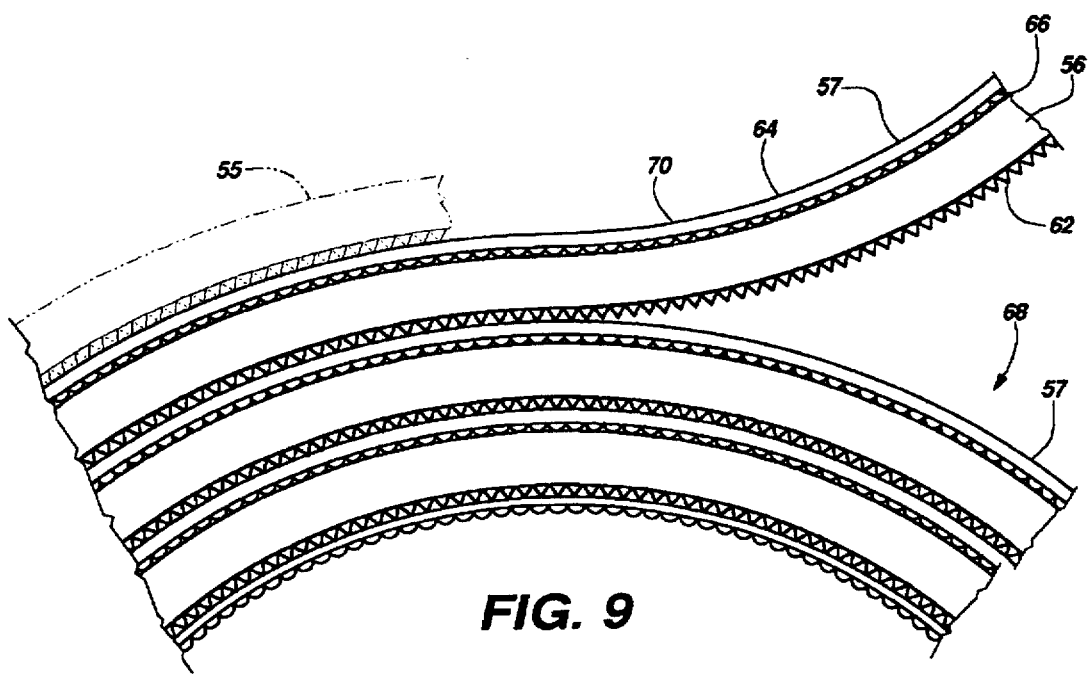
FIG. 9 is a schematic view of the assembly of FIG. 8 wound into a roll, with a portion of the paper base layer unwound from the roll to illustrate the transfer of the liner from the adhesive coated side of the base layer to the absorbent side of the base layer.

The manufacture of the tape assembly 54 is illustrated in FIGS. 6–9. As shown in FIG. 6, a paper base layer 56 may be first coated with a clay layer, not shown, which makes the base layer more receptive to a smooth layer of high tack adhesive. Alternatively, the clay coating may be omitted. A high tack adhesive is applied to a transfer liner 57 and, as shown in FIG. 7, brought together with the base layer 56 to cause the high tack adhesive to form a layer 62 on the base layer to thereby form the tape 55. Typically these steps will take place on very wide rolls of paper. The transfer liner 57 is brought together with the base layer at a nip which causes the adhesive layer to adhere to the base layer. At this point the precursor tape 55 and transfer liner 57 may be wound into rolls for further operations either within the same plant or at a different converting location. As shown in FIG. 8, the low-tack adhesive layer 66 is next applied to the exposed surface of the transfer liner 57 and the completed assembly 54 wound into final rolls 68 and cut to the desired width, in a preferred embodiment about two inches wide. When wound into the roll 68, as shown in FIG. 9, the low-tack adhesive layer 66 engages with an underlying exposed outer surface 58 of the paper base layer 56. This engagement performs two functions. First, it retains the tape 55 in a roll. Second, and more importantly, the low-tack adhesive causes the transfer tape to "jump" from the inner surface of the base layer to which it was applied to the outer surface of the base layer beneath it. The result of this transfer or jump is that when the tape 55 is removed from the roll 68, as shown in FIG. 11, the high tack adhesive layer 62 is presented for adhesion to the wall board panels across the joint, while the transfer liner 57 is disposed on the outer surface of the tape, as shown in FIG. 5. The low-tack adhesive thus does the job of peeling away the transfer liner from the base layer prior to adhesion. To achieve this effect, the peel strength of the high-tack adhesive from the release surface of the transfer liner, is selected to be less than the peel strength of the low tack adhesive from the outer surface of the paper base layer. For example the peel strength of the high tack adhesive from the silicone surface of the transfer liner may be about 10–15 grams, while the peel strength of the removable adhesive from the outer surface of the paper base layer may 40–300 grams.

Figure 10:
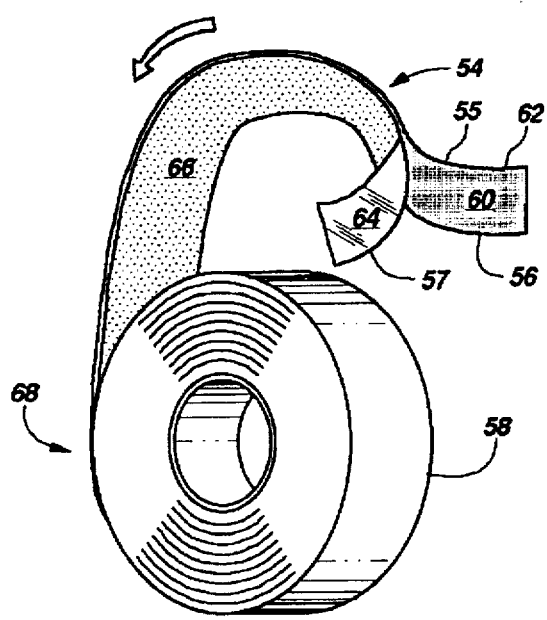
FIG. 10 is an isometric view of the tape assembly of FIG. 8 being wound on a roll.

The phenomenon of the side-switching transfer liner is illustrated in FIG. 9, which shows the winding of the manufactured tape assembly 54 onto a roll 68, and FIG. 10, which shows the unwinding of an applied tape assembly 70 from the same roll 68. The applied tape assembly 70 has the same components as the manufactured tape assembly 54, but in a different order. As shown in FIG. 9, the outer wrap of base layer paper 56 may be removed so that only the release surface of the transfer liner is exposed.

The applied tape assembly 70 may be dispensed from the roll 68 directly onto the joint to be taped. Various roll tape dispensers may be employed. As shown in FIG. 5, the applied tape assembly will consist of a length of tape 55 attached to the wall and a transfer liner 57 connected by the removable adhesive layer to the outer surface 58 of the tape. Once applied, a drywall knife, burnishing implement, or other stiff object may be run along the tape over the transfer liner 57 to press the tape down onto the wall board panels. If the joints are to be mudded immediately the lengths of transfer liner 57 may be removed immediately. Otherwise, the transfer liner 57 may be left in place, thereby protecting the absorbent outer surface of the paper layer from dust and contamination until such time as the mud is ready to be applied.

Because the removable adhesive leaves little residue on the outer surface 58 of the paper base layer 56, the receptability of the paper to mud is substantially unimpaired and a sound bond may be formed.

In the past, self-adhesive mesh tape was used in veneer plaster over wall board applications. The traditional mudded drywall tape is not appropriate for plaster applications because no mud is used. The tape assembly of this invention may be used for veneer plaster applications as no mud is required, and the receptiveness of the paper tape to plaster is not compromised.

The tape 55 may also be formed with perforations as discussed above, in which case the entire tape assembly 54 would be perforated, typically as it is wound into the final rolls 68. In addition, the tape assembly 54 is preferably creased down the center prior to winding on rolls to assist in application of the tape 55 to corner joints.

Also as an alternative two release liners may be provided, one which is silicone coated on the high-tack adhesive surface of the paper base layer, and one on the uncoated paper side of the tape which is connected with a low-tack removable adhesive.

Figure 12:
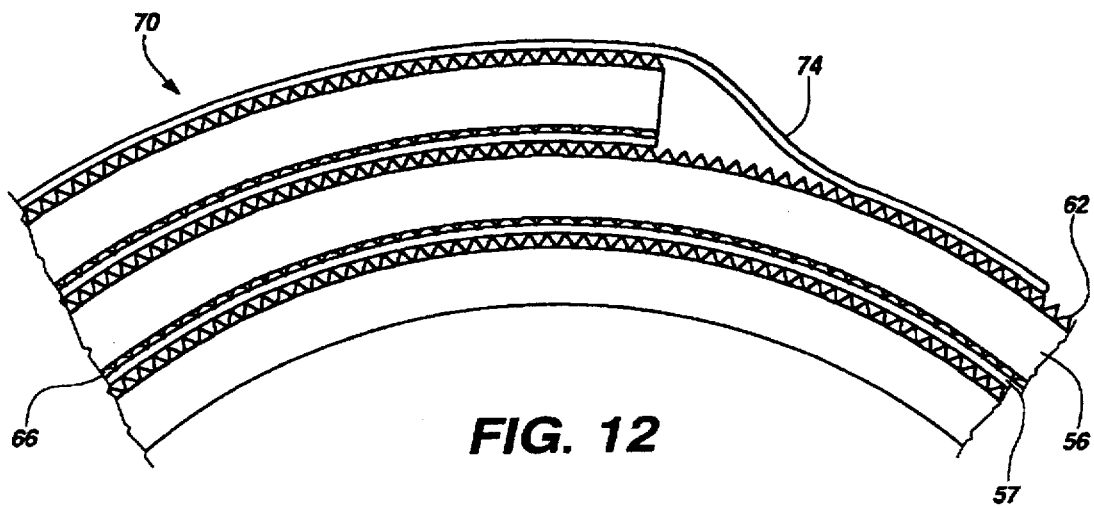
FIG. 12 is a schematic view of an alternative embodiment tape assembly of this invention.

As shown in FIG. 12, the tape assembly 54 may be wound into a roll 72 with the high-tack adhesive layer 62 facing outwardly. In the roll 72 the final wrap of tape 55 will have an outwardly facing adhesive layer which may then be encircled by a release liner 74 having an inwardly facing silicone coated release layer. The exterior surface of the release liner 74 may be imprinted with product information or other indicia, and serves to prevent the unwrapping of the roll prior to use. When a user is ready to use the roll the release liner 74 is easily pulled off the outer wrap of the roll.

It should be noted that although specific types of adhesives have been disclosed above, alternative adhesives having similar properties may also be employed where conditions or economic factors require.

It is understood that the invention is not limited to the particular construction and arrangement of parts herein illustrated and described, but embraces such modified forms thereof as come within the scope of the following claims.

We claim:

1. A tape assembly for bridging the joint between two adjacent wall board panels, the assembly comprising:
   a) a paper base layer having an outer surface;
   b) a high tack adhesive disposed on an inner surface of the paper base layer;
   c) a transfer liner having a release surface which is engaged with the high tack adhesive on the base layer;
   d) a low tack adhesive disposed on a surface of the transfer liner opposite the release surface, wherein the base layer and the transfer liner are wound into a roll such that the low tack adhesive on the transfer liner engages the outer surface of an underlying portion of the paper base layer, and wherein the force required to separate the high tack adhesive on the inner surface of the base layer from the transfer liner is less than the force required to separate the low tack adhesive on the release liner from the outer surface of the base layer, the low tack adhesive being such that when the release liner is removed from the base layer, little residue is left on the base layer, and the receptiveness of the paper base layer to drywall mud or plaster is not substantially impaired.

2. The tape assembly of claim 1, wherein the tape assembly is wound into a roll such that the high tack adhesive on the paper base layer faces outwardly, relative to the paper base layer.

3. The tape assembly of claim 2 further comprising an outside wrapping release liner which encircles the roll and releasably adheres to the outwardly facing high tack adhesive on the paper base layer.

4. The tape assembly of claim 1 wherein the tape assembly is wound into a roll such that the high tack adhesive on the paper base layer faces inwardly, relative to the paper base layer.

5. The tape assembly of claim 1 further comprising portions of the paper base layer which define a plurality of perforations.

6. A wall board assembly comprising:
   a) a first wall board panel;
   b) a second wall board panel adjacent the first wall board panel, wherein a joint is defined between the first wall board panel and the second wall board panel;
   c) a paper base layer which overlies the joint and which is adhered by a pressure sensitive adhesive to both the first wall board panel and the second wall board panel, wherein the paper base layer has an outer surface which faces outwardly from the wall board panels; and
   d) a releasable liner which overlies and covers the outer surface of the paper base layer, and which is connected thereto by a low tack adhesive, wherein the liner is removable from the paper base layer, the low tack adhesive being such that when the liner is removed from the paper base layer the receptiveness of the paper base layer to drywall mud or plaster is not substantially impaired.

7. The tape assembly of claim 6 further comprising portions of the paper base layer which define a plurality of perforations.

8. A method for forming a tape assembly for bridging the joint between two adjacent wall board panels, the method comprising the steps of:
   a) applying a high tack adhesive to a first surface of a transfer liner;
   b) engaging the high tack adhesive on the first surface of the transfer liner with an inner surface of a paper base layer, to connect the transfer liner to the base layer;
   c) applying a low tack adhesive to a second surface of the transfer liner; and
   d) winding the base layer with connected transfer liner into a roll such that the low tack adhesive on the transfer liner engages the outer surface of an underlying portion of the Wound paper base layer, and wherein the force required to separate the high tack adhesive on the first surface of the base layer from the transfer liner is less than the force required to separate the low tack adhesive of the release liner from the outer surface of the base layer, the low tack adhesive being of the type such that when the release liner is removed from the base layer the paper base layer remains receptive to drywall mud or plaster.

9. A method for forming a tape assembly for bridging the joint between two adjacent wall board panels, the method comprising the steps of:

a) forming a paper base layer with an outer surface and an inner surface having a transfer finer attached thereto with a high tack adhesive;

c) applying a low tack adhesive to a surface of the transfer liner; and d) winding the base layer with connected transfer finer into a roll such that the low tack adhesive on the transfer liner faces outwardly to engage the outer surface of an overlying paper base layer, and wherein the force required to separate the high tack adhesive on the surface of the base layer from the transfer liner is less than the force required to separate the low tack adhesive of the release liner from the outer surface of the base layer, the low tack adhesive being of the type such that when the release liner is removed from the base layer the paper base layer remains receive to drywall mud or plaster.

10. The method of claim 9 further comprising the steps of a) exposing the paper base layer in the roll so the high tack adhesive faces outwardly relative to the paper base layer; and b) applying an outside wrapping release liner to encircle the exposed high tack adhesive and thereby form the roll in a form suitable for shipping which has no exposed adhesive surfaces.

11. The method of claim 9 further comprising the steps of:

a) withdrawing the tape assembly comprised of the paper base layer and the connected transfer liner from the roll and applying the paper base layer to a joint between two adjacent wall board panels so the high tack adhesive adheres the base layer to the wall board panels; and b) peeling away the attached transfer liner to expose the outer surface of the paper base layer.

* * * * *